March 22, 1938.    G. L. LARISON    2,112,201
MEANS FOR LOADING A TRAILER ONTO A TRUCK
Filed Sept. 28, 1936    5 Sheets-Sheet 1
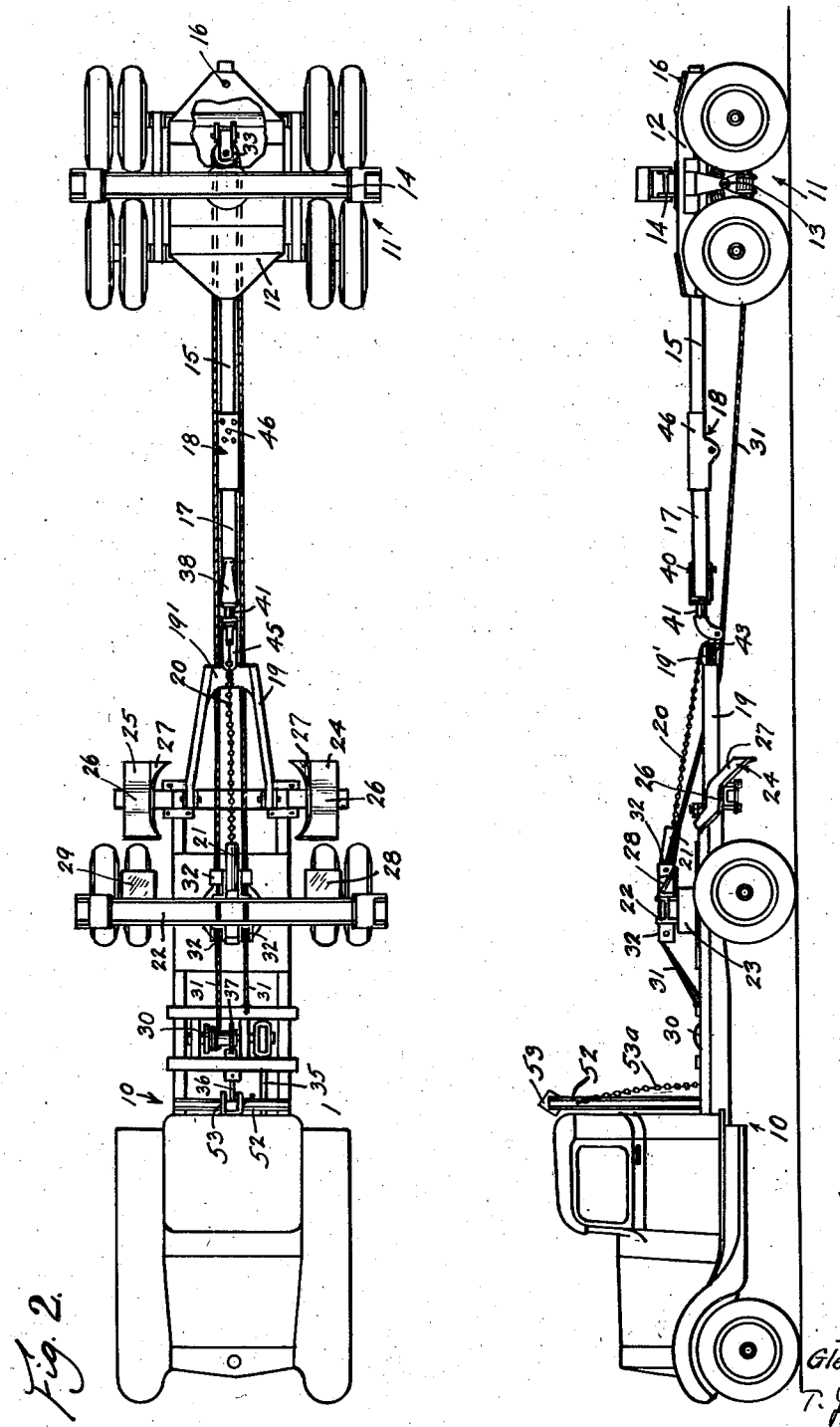

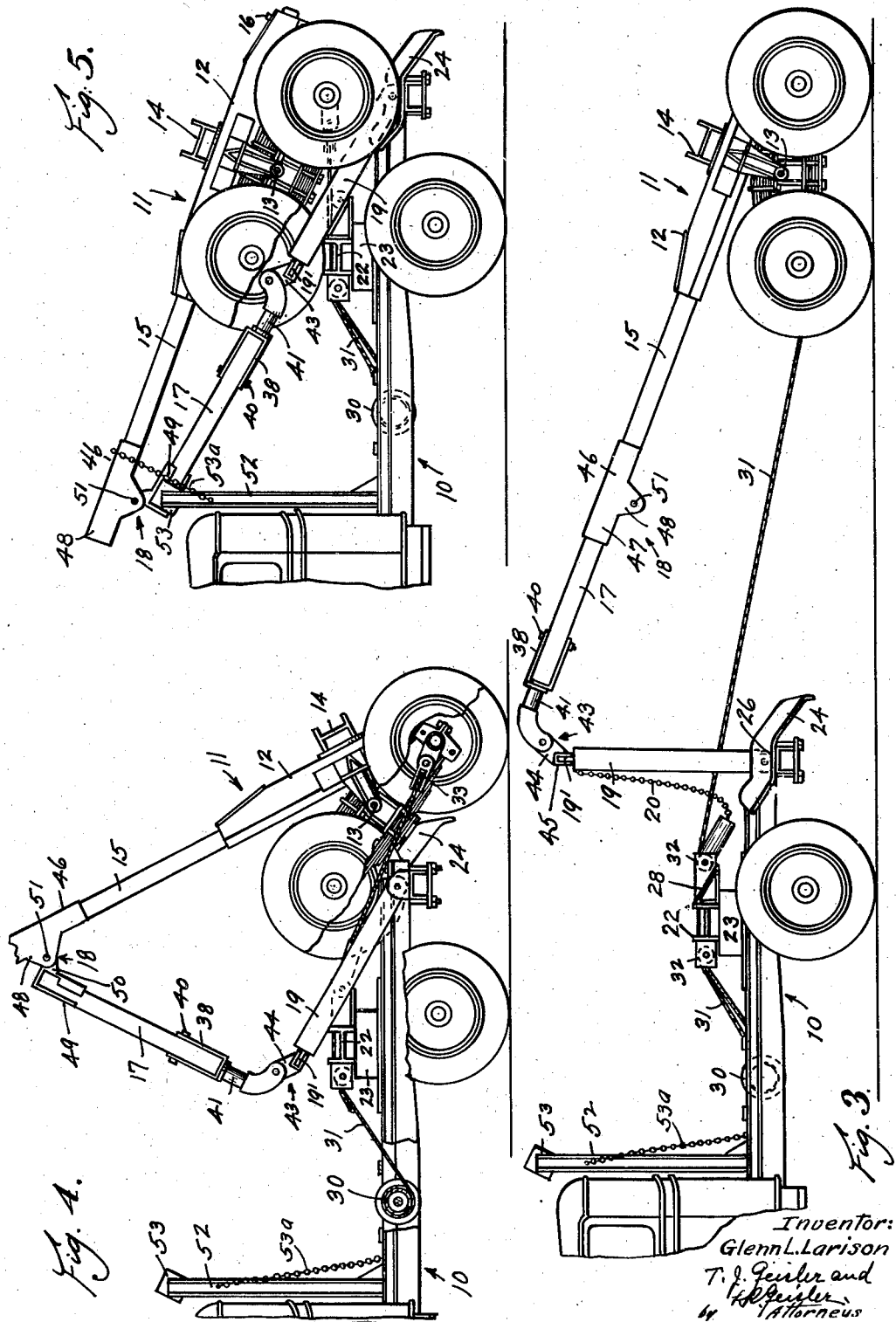

March 22, 1938.      G. L. LARISON      2,112,201
MEANS FOR LOADING A TRAILER ONTO A TRUCK
Filed Sept. 28, 1936      5 Sheets-Sheet 3
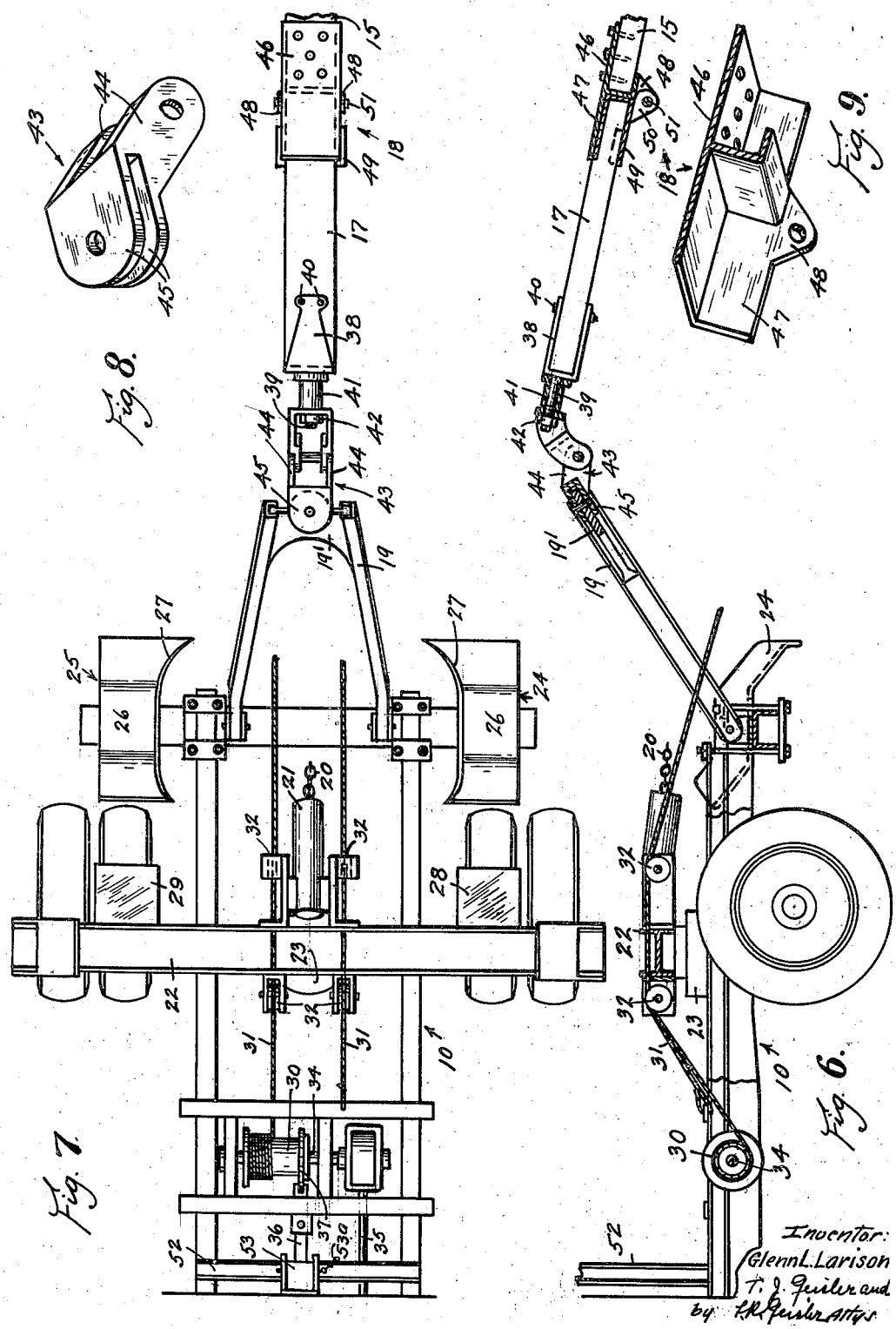

March 22, 1938.   G. L. LARISON   2,112,201
MEANS FOR LOADING A TRAILER ONTO A TRUCK
Filed Sept. 28, 1936   5 Sheets-Sheet 4
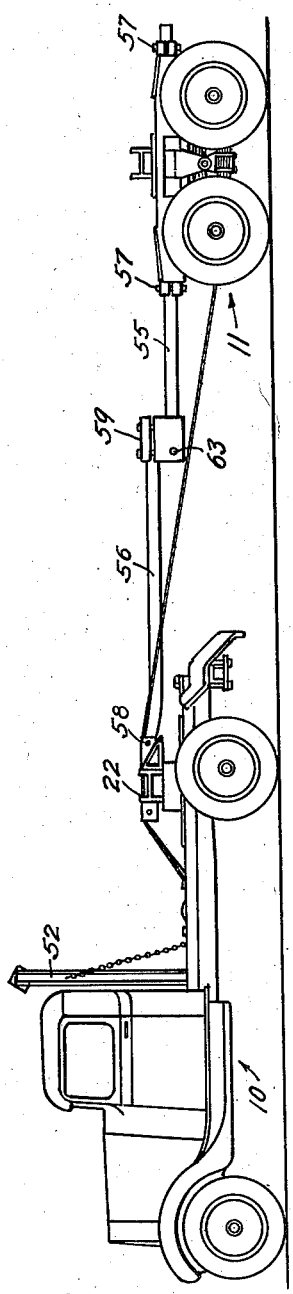
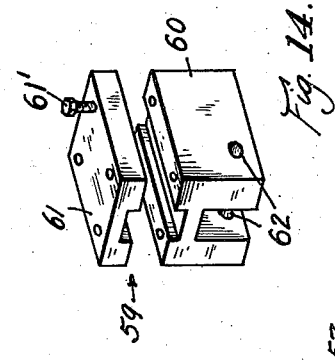
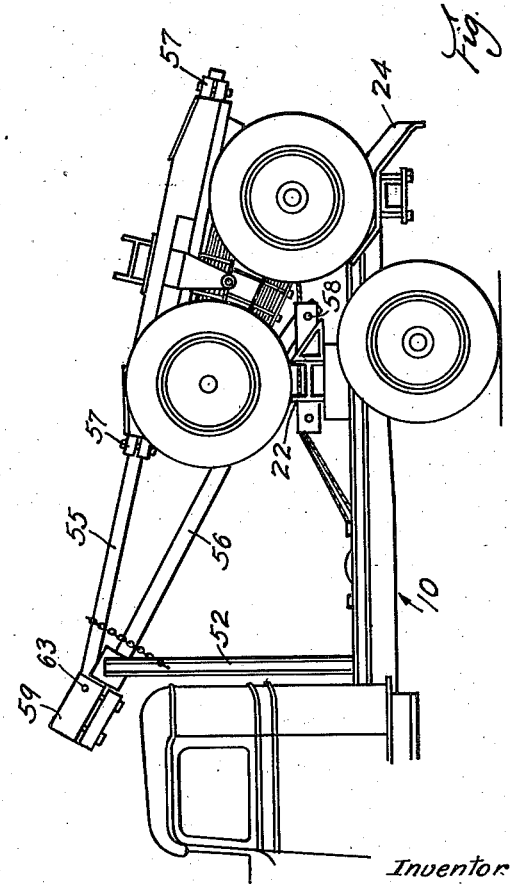
Inventor:
Glenn L. Larison March 22, 1938.　　　G. L. LARISON　　　2,112,201
MEANS FOR LOADING A TRAILER ONTO A TRUCK
Filed Sept. 28, 1936　　　5 Sheets-Sheet 5
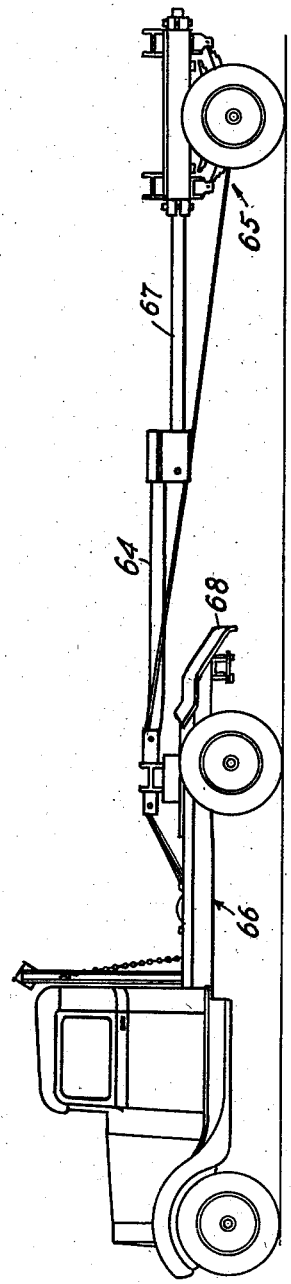
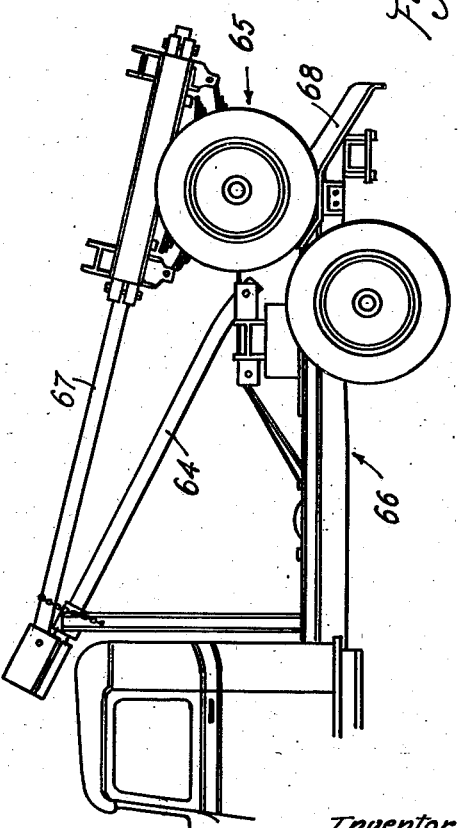
Inventor:
Glenn L. Larison Patented Mar. 22, 1938

2,112,201

UNITED STATES PATENT OFFICE 2,112,201

MEANS FOR LOADING A TRAILER ONTO A TRUCK

Glenn L. Larison, La Grande, Oreg.

Application September 28, 1936, Serial No. 102,946

19 Claims. (Cl. 214—65)

My invention relates to trailers used behind trucks, particularly to trailers used in the hauling of logs or lumber.

It is desirable, when the logs or lumber have been unloaded from the trailer, and the trailer is to be hauled away for any distance, to load the trailer onto the rear of the truck instead of pulling it along behind the truck. Loading the empty trailer onto the truck is particularly desirable when the truck is required to follow a narrow, crooked or steep road thru the woods. But, due to the weight of such trailers, particularly the two-axle trailers now generally required for log hauling, the lifting of the trailer onto the truck presents certain difficulties.

An object of my invention is to provide simple, practical means for facilitating the loading of a trailer, and particularly a two-axle trailer, onto a truck.

Due to the weight and construction of two-axle logging or lumber trailers, the problem involved is not only the lifting of the trailer onto the truck, but placing it in proper carrying position on the truck and holding it securely in such position.

Another object of my invention, therefore, is to provide means constituting part of the truck and trailer equipment functioning to cause the trailer to be loaded and properly placed in the most advantageous carrying position on the truck and to be securely held in such position.

Another object is to have the trailer lifted into the desired resting position on the truck by means controllable from the truck, making it unnecessary to back the trailer against a tree or other stationary object, and making it unnecessary to employ any external means for effecting the loading of the trailer onto the truck.

If, when the trailer is carried on the truck, the truck is required to pass over rough logging roads, there will be jarring and bouncing of the trailer while on the truck, and particularly if there is metal to metal contact between the body or axle of the trailer and the supporting means on the truck; and such bouncing causes undesirable vibration, shock and strain. A further object of my invention is to provide means whereby the trailer will rest on the tires of its wheels when loaded on the truck, thus permitting the trailer tires to absorb the greater portion of the shock and vibration.

With the hauling of logs, or lumber, the trailer must be equipped with and attached to the truck by a tongue or reach of suitable length. But when such trailer is to be loaded onto the truck suitable provision should be made for the automatic folding of the tongue. I have found that means for loading trailers onto trucks disclosed in certain prior patents make insufficient allowance for the proper length of tongue, or insufficient provision for the automatic folding of the tongue, and therefore are not practical except for equipment designed for very restricted use.

Accordingly, a further object of my invention is to provide a tongue, suitable for either one or two axle trailers of standard makes, of such design and construction that it can be made of suitable length, and will be automatically and conveniently folded when the trailer is lifted onto the truck.

Another object is to provide suitable holding means on the truck for the folded tongue when the trailer is loaded on the truck.

These and incidental objects I attain by constructing my loading means, carrying means, reach or tongue and other parts of my device in the manner to be described with reference to the accompanying drawings, in which:

Fig. 1 is a side elevation of the truck and attached trailer illustrating the position of the truck, trailer and connecting parts during the hauling of the logs or lumber;

Fig. 2 is a plan view corresponding to Fig. 1;

Figs. 3, 4, and 5 are partial side elevations, drawn on a slightly larger scale, illustrating various stages in the loading of the trailer on the truck;

Fig. 6 is an enlarged fragmentary side elevation with portions shown in section, illustrating the operation of certain parts constituting important elements of my invention;

Fig. 7 is a partial plan view corresponding to Fig. 6;

Figs. 8 and 9 are detail views, in perspective, of hinge elements comprising part of the trailer tongue construction, Fig. 9 being also in section;

Fig. 10 is a side elevation of the truck and attached trailer, similar to Fig. 1, but illustrating a modified form of the reach or tongue by which the trailer is connected to the truck;

Fig. 11 is a partial side elevation, drawn on slightly larger scale than Fig. 10 and similar to Fig. 5, illustrating the folded position of the two-sectional tongue of Fig. 10 when the trailer is loaded onto the truck;

Fig. 12 is a side elevation, similar to Fig. 10, but illustrating my invention in use with a single axle trailer instead of a double axle trailer;

Fig. 13 is a partial side elevation similar to Fig. 11, illustrating the position of the single axle trailer and two-sectional tongue when the trailer is loaded onto the truck; and Fig. 14 is a view, in perspective and on enlarged scale, of a hinge element comprising part of a modified construction of my trailer tongue.

Referring first to Figs. 1 and 2, the truck as a whole is indicated by 10 and the trailer by 11. The trailer illustrated in the drawings is the two-axle type of trailer now most generally required for use in hauling logs, the trailer 11 comprises the customary body frame 12 pivotally mounted on a transverse shaft 13, which permits tilting of the body in either direction. The bunk 14 is pivotally mounted on the trailer body frame 12 for movement in a horizontal plane. A removable tongue rear section 15 is inserted thru a suitable channel extending thru the center of the body frame 12, and this tongue rear section is secured against longitudinal movement when the trailer is to be loaded onto the truck by a pin 16. A tongue middle section 17 is connected to tongue rear section 15 by means of a hinge 18, the details of which will be described later.

Tongue front section 19, hingedly attached to the rear of the truck 10, is connected to tongue middle section 17 by suitable means also to be described later, and providing in effect a universal joint between tongue front section 19 and tongue middle section 17. The trailer is thus attached to the truck by a three-sectional reach or tongue comprised of rear section 15, middle section 17 and front section 19. The rear end of tongue front section 19 to which tongue middle section 17 is connected is normally held in a horizontal position by a chain or cable 20, the front end of which chain or cable is preferably connected to the truck by a spring located within a housing 21.

The truck 10 is provided with the usual bunk 22 pivotally mounted for rotation in a horizontal plane on a suitable support 23 attached to the frame of the truck. The bunk 22 on the truck and the bunk 14 of the trailer are approximately the same height from the ground.

At the rear of truck 10 a pair of inclined tracks or ramps 24 and 25, up which the wheels of the trailer may be drawn, are rigidly secured and are spaced the same distance apart as the inside wheels of the trailer 11. These inclined tracks or ramps 24 and 25 are preferably made with a central, horizontal section 26, and with a curved vertical flange 27 on their inner edge. A second pair of inclined tracks or ramps 28, 29 are rigidly attached to the rear of bunk 22, are spaced the same distance apart as ramps 24, 25, and lead to the top of bunk 22.

A drum 30 is transversely mounted for rotation in the frame of truck 10 and is adapted to have a cable 31 wound on it. The cable 31 passes thru the bunk 22 supported on suitable pulleys or sheaves 32, thence passes under the outer end of tongue front section 19, thence around a pulley or sheave 33, attached to the rear axle of the trailer, and thence back to the truck, the end of the cable being secured by suitable means to the truck.

The drum 30 is shown more clearly in Fig. 7. The drum is slidably mounted on a shaft 34, said shaft being connected by suitable gearing (not shown) to a shaft 35 adapted to be driven through a two-way power take-off (not shown) connected with the transmission gears of the truck, said two-way power take-off having one speed forward and one speed in reverse. A lever 36, operable from the driver's seat of the truck, has a forked end engaging an annular flange 37 of the drum 30, which lever serves to slide the drum endwise on the shaft 34, thereby enabling the drum to be moved into or out of engagement with means (not shown) which are secured to shaft 34 and rotated with it. A hand operated winch might be substituted for the motor driven drum if desired.

The construction of the means by which tongue middle section 17 and tongue front section 19 are connected is shown in Figs. 6, 7, and 8. A cap 38, having a stub-shaft 39 rigidly secured thereto, is attached to the front end of tongue middle section 17 by bolts 40. On the stub shaft 39 a swivel link 41 is rotatably held by a nut 42. The outer end of swivel link 41 is curved and forked, and between the pair of curved forks a secondary link 43 is pivoted, the shape of which is shown clearly in Fig. 8. The secondary link 43 is forked at both ends, as shown, one pair of forks 44 being perpendicular to the other pair 45. The forks 44 are hingedly attached to the forks of the swivel link 41 while the forks 45 are hinged to the rear end of tongue front section 19.

The hinge 18 connecting tongue rear section 15 and tongue middle section 17 is shown in Figs. 6, 7, and 9. It comprises a cap 46 fitting over the forward end of the tongue rear section 15 and secured thereon by bolts, the said cap 46 being made with extending top and sides forming a U-shaped flange 47, and the sides of said cap having downwardly extending ears 48. A companion cap 49, adapted to fit within the U-shaped flange 47, and having similar downwardly extending ears 50, arranged adjacent to the ears 48, is bolted on the adjacent end of tongue middle section 17. A suitable pin 51 extending thru the two pairs of ears 48 and 50 permits limited vertical hinged movement of the tongue sections 15 and 17.

The manner in which the trailer is loaded onto the truck and the operation of the various parts referred to may now be described with reference to Figs. 1, 3, 4, and 5. From the initial position of trailer 11, with reference to the truck 10, as shown in Fig. 1, the trailer is moved towards the truck by the winding of the cable 31 on the drum 30, the drum being rotated in the manner previously indicated. As the trailer is moved towards the truck, the tongue front section 19 is automatically first swung upward, as shown in Fig. 3, and the tongue front section 19 then continues swinging forward until it comes to rest against the bunk 22, as shown in Fig. 4. As the drum 30 continues to wind the cable 31 the tongue sections 15 and 17 begin to fold as shown in Fig. 4. As the winding of cable 31 pulls the trailer against the ramps attached to the rear of the truck, the inside wheels at the front of the trailer mount the first pair of runways or ramps 24 and 25, as illustrated in Fig. 4. As the pull on cable 31 continues, the inner front wheels of the trailer move up over the second pair of runways or ramps 28, 29, and both pairs of forward wheels of the trailer reach the top of the bunk 22. Meanwhile, the inner rear wheels of the trailer have mounted onto the first pair of runways or ramps 24, 25 and have come to rest on the central horizontal sections 26 of the runways or ramps 24 and 25, as shown in Fig. 5.

A standard 52 is rigidly attached to the truck, and the standard holds at its top a U-shaped rest 53 which is adapted to support the end of tongue section 17 when the trailer has come to rest in the position indicated in Fig. 5. A chain 53a has one end rigidly attached to the standard 52. The other end of chain 53a is looped over the tongue rear section 15, after the tongue is at rest, as shown in Fig. 5, and fastened to the standard 52 by suitable locking means (not shown).

Fig. 5 illustrates the final position of the trailer and associated parts when the loading of the trailer onto the truck has been completed. It will be noted that the trailer, when loaded on the truck, is carried in a position which insures proper distribution of its weight on the truck. It will also be noted that the tongue sections are safely and securely held in position, and that there is no danger of any of the tongue sections damaging the cab or other parts of the truck during or after the loading operation.

The unloading of the trailer is likewise a very simple matter and is accomplished without the necessity of the operator leaving the driver's seat of the truck. The power take-off gears are shifted into reverse position causing the drum 30 slowly to unwind cable 31, and the unwinding of the cable 31 permits the trailer to roll back until the rear wheels of the trailer touch the ground in the position shown in Fig. 4. The drum 30 is then moved by lever 36 out of engagement with connecting holding members causing it to be converted into a free-running drum, thereby permitting the cable 31 to be freely unwound. With the cable 31 free to be unwound, and the brakes on the trailer applied, the truck 10 is now driven forward, causing the tongue sections to unfold and the trailer and tongue sections to return to the position shown in Fig. 3 and finally to the position in Fig. 1, whereupon the trailer and truck are now ready for being loaded with logs or lumber.

The tongue sections 15, 17, and 19 are preferably made of steel. It is apparent from the construction of the tongue and hinge elements that the total tongue length between truck and trailer can easily be modified by changing the length of the tongue sections 15 and 17.

The tongue, connecting trailer and truck, shown in Figs. 1 to 7, inclusive, is comprised of three separate sections joined together by suitable means. It is possible, however, in my invention to construct my tongue or reach with only two sections instead of three and such modified tongue construction will be entirely satisfactory for logs or lumber of short length. Such modified tongue is shown in Figs. 10, 11, 12, and 13.

Referring first to Fig. 10, the tongue connecting the trailer 11 to the truck 10 comprises a tongue rear section 55 and a tongue front section 56. Tongue rear section 55 is removably inserted in a channel extending horizontally, longitudinally thru the center of the frame of trailer 11 and the tongue section 55 may be secured against longitudinal movement by clamps 57 attached to said tongue section 55 adjacent each end of said channel. Tongue front section 56 is attached to the rear of bunk 22 on the truck 10 by a hinge 58, permitting tongue front section 56 to swing in an approximately vertical plane. Tongue front section 56 and tongue rear section 55 are connected by a hinge element 59 which is shown more clearly in Fig. 14. This hinge element 59 comprises an H-shaped element 60 to the top of which is attached a cap 61 by screws 61'. Said cap 61 is securely clamped over the rear end of tongue front section 56 by the screws 61'. The sides of H-shaped element 60 are extended downward and form a vertical flange on each side. Holes 62 are provided at the front of these flanges. A corresponding hole is provided in the forward end of tongue rear section 55, and a suitable pin 63 thru these registering holes in element 60 and tongue section 55. This hinge element 59 will permit tongue sections 55 and 56 to fold together upwardly but will hold them in horizontal position when the tongue is in fully extended position, as illustrated in Fig. 10. As the trailer is loaded onto the truck by the winding of cable 31 on the drum 30 in the manner previously explained, the tongue folds into the position shown in Fig. 11 and is supported in its folded position by the standard 52 in the same manner as already described with reference to the three-sectional tongue of Figs. 1 to 7.

It would be possible in place of the pair of runways or ramps 24 attached to the rear of truck 10, in the construction illustrated in Figs. 10 and 11, to have a single inclined runway or ramp extending across the entire width of the back of the truck 10. While such a single broad ramp would enable my loading device to function in the same manner as indicated, I consider a pair of ramps attached to the rear of the truck as preferable and more practical.

Thus far I have described my invention as applied to two axle trailers. While I consider this the most important application of my invention, nevertheless, my invention may also be used very satisfactorily with single axle trailers. Figs. 12 and 13 illustrate the application of my invention with a single axle trailer 65 connected to the truck 66 by a two-sectional tongue 64—67. In this modified use of my invention the truck 66 need be equipped with only a single pair of runways or ramps 68, as shown clearly in Fig. 13. In all other respects the construction is the same as that already described.

The single axle trailer 65 of Figs. 12 and 13 might also, if desired, be attached to the truck by a three-sectional tongue similar to that shown for the double axle trailer in Figs. 1 to 7.

The term "ramp" as used in reference to my invention is to be understood as meaning any inclined plane, track, or runway on which a wheel of a trailer or similar vehicle may roll and be supported.

I claim:

1. In combination with a double axle trailer a truck adapted to tow said trailer, and a tongue attaching said trailer to said truck, means for loading said trailer on said truck, said loading means including a pair of inclined runways, one on each side, secured to the rear of the truck chassis, a second pair of inclined runways on said truck located forward of and above and in approximate alinement with said first mentioned pair of runways, a drum mounted on said truck, means for rotating said drum, a cable connecting said trailer and said drum, one end of said cable adapted to be wound on said drum, whereby the rotation of said drum will cause said trailer to be drawn towards the truck until the forward wheels of said trailer touch said first mentioned pair of runways, whereupon continued rotation of said drum will cause the forward wheels of said trailer to roll up on said first mentioned pair of runways and subsequently onto said second pair of runways, the rear wheels of said trailer during the last interval rolling up on said first mentioned pair of runways.

2. The combination described by claim 1 with each of the first pair of said runways having two inclined sections, a horizontal section therebetween, and a vertical guide flange.

3. In combination with a truck, and a trailer adapted to be towed by said truck, a foldable tongue connecting said trailer to said truck, said tongue including a tongue rear section attached to said trailer, a tongue middle section, a hinge connecting said tongue rear section and said tongue middle section, a tongue front section hingedly mounted on said truck, a universal joint connection between said tongue front section and said tongue middle section.

4. The combination described by claim 3 with the addition of means for holding said tongue front section extended from said truck.

5. In combination with a truck, and a trailer adapted to be towed by said truck, a foldable tongue connecting said trailer to said truck, said tongue including a tongue rear section adjustably attached to said trailer, a tongue middle section, a hinge connecting said tongue rear section and said tongue middle section, a tongue front section hingedly mounted on said truck, a universal joint connection between said tongue front section and said tongue middle section, and spring means adapted to suspend said tongue front section resiliently extended from said truck.

6. The combination of a truck, a trailer adapted to be towed by said truck, a foldable tongue connecting said trailer to said truck, said tongue having a tongue rear section attached to said trailer, a tongue middle section, and a tongue front section, said tongue front section hingedly attached to said truck; means for loading said trailer on said truck, said loading means including a pair of runways, one on each side, secured to the rear end of said truck, each of said runways adapted to engage a wheel of said trailer; a drum mounted on said truck, means for rotating said drum, a cable connecting said trailer and said drum, one end of said cable adapted to be wound on said drum by the rotation of said drum; whereby the rotation of said drum will cause said trailer to be drawn towards said truck until a wheel on each side of said trailer touches said runways and whereupon continued rotation of said drum will cause said trailer wheels to roll upon said runways.

7. The combination described by claim 6 with the addition of means for holding said tongue in place on said truck when said trailer is loaded on said truck.

8. The combination described by claim 6 with the addition of means adapted to hold said tongue front section extended from the rear of said truck.

9. The combination of a truck, a double-axle trailer adapted to be towed by said truck, a foldable tongue connecting said trailer to said truck, said tongue including a tongue rear section attached to said trailer, a tongue middle section, a hinge connecting said tongue rear section and said tongue middle section, a tongue front section hingedly mounted on said truck, a universal joint connection between said tongue front section and said tongue middle section, means adapted to hold said tongue front section extended from said truck, a pair of runways, one on each side secured to the rear end of said truck, each of said runways adapted to engage a wheel of said trailer when said trailer is moved onto said truck, a second pair of runways on said truck located forward of and in approximate alinement with said first mentioned pair of runways, a drum mounted on said truck, means for rotating said drum, a cable connecting said trailer and said drum, one end of said cable adapted to be wound on said drum, a sheave on said truck, said sheave supporting said cable between said drum and said trailer, and means for supporting said tongue sections on said truck when said trailer is loaded onto said truck.

10. The combination described in claim 9 with said means for rotating said drum operated by the motor of said truck.

11. The combination of a trailer and a truck of the character described, an inclined runway rigidly secured to the rear of said truck and located rearwardly of the rear axle of said truck, a foldable tongue connecting said trailer to said truck, means located on said truck for drawing said trailer towards said truck, whereby to cause said tongue to fold up and the trailer wheels to roll up said runway.

12. The combination described by claim 11 including a support on said truck for said tongue when in folded position, and means for securing said tongue to said support.

13. In combination with a truck and a trailer of the character described adapted normally to be towed by said truck, a pair of inclined runways, one on each side, rigidly secured to the rear of said truck, said runways attached to the truck rearwardly of the rear axle of said truck, each of said runways adapted to provide a track and a support for a wheel of said trailer when said trailer is moved onto said truck, a tongue for said trailer and means for supporting said tongue on said truck.

14. The combination described by claim 13 with the lower ends of said inclined runways being substantially the same height from the ground as the rear axle of said truck.

15. The combination described by claim 13 with each of said runways having two inclined sections and a horizontal section therebetween.

16. The combination described by claim 13 with each of said runways having two inclined sections and a horizontal section therebetween, the length of said horizontal section being less than the diameter of the wheels of said trailer.

17. The combination described by claim 13 including means for pulling said trailer towards said truck and for causing a trailer wheel to roll up each of said runways.

18. The combination described by claim 13 including means for pulling said trailer towards said truck and for causing a trailer wheel to roll up each of said runways, and means for securing said trailer on said truck when a trailer wheel has mounted a predetermined distance up each of said runways.

19. In combination with a logging truck and a logging trailer adapted normally to be towed by said truck, a pair of inclined runways, one on each side, rigidly secured to the rear of said truck, said runways located rearwardly of the rear axle of said truck, each of said runways adapted to provide a track and a support for a wheel of said trailer when said trailer is moved onto said truck, a tongue for said trailer and means for supporting said tongue on said truck, each of said runways having two inclined sections and a horizontal section therebetween, the length of said horizontal section being less than the diameter of the wheels of said trailer, means for pulling said trailer towards said truck and for causing a trailer wheel to roll up each of said runways, and means for securing said trailer on said truck with a trailer wheel resting on each of said horizontal sections of said runways.

GLENN L. LARISON.